(12) United States Patent
Chou

(10) Patent No.: US 9,556,788 B2
(45) Date of Patent: Jan. 31, 2017

(54) ROTARY ENGINE

(71) Applicant: Jung-Kuang Chou, New Taipei (TW)

(72) Inventor: Jung-Kuang Chou, New Taipei (TW)

(*) Notice: Subject to any disclaimer, the term of this patent is extended or adjusted under 35 U.S.C. 154(b) by 367 days.

(21) Appl. No.: 14/341,091

(22) Filed: Jul. 25, 2014

(65) Prior Publication Data

US 2015/0040854 A1 Feb. 12, 2015

(51) Int. Cl.

| F02B 53/04 | (2006.01) |
|---|---|
| F02B 53/10 | (2006.01) |
| F04C 9/00 | (2006.01) |
| F02B 55/14 | (2006.01) |
| F02B 55/08 | (2006.01) |
| F02B 53/12 | (2006.01) |

(52) U.S. Cl.
CPC .............. *F02B 55/14* (2013.01); *F02B 53/10* (2013.01); *F02B 53/12* (2013.01); *F02B 55/08* (2013.01); *Y02T 10/166* (2013.01); *Y02T 10/17* (2013.01)

(58) Field of Classification Search
CPC ........... F02B 55/10; F02B 55/14; F02B 55/16; F02B 55/08; F02B 53/00; F02B 53/10; F02B 53/12; Y02T 10/166; Y02T 10/17
USPC .......... 60/39.44, 39.43, 39.35; 123/200, 218, 123/227, 241, 243, 244, 249; 418/14, 48–249
See application file for complete search history.

(56) References Cited

U.S. PATENT DOCUMENTS

| 1,025,117 A | * | 5/1912 | Boyer | F02C 5/04 |
| | | | | 60/39.34 |
| 1,307,631 A | * | 6/1919 | Jacques | F01C 1/344 |
| | | | | 418/146 |
| 1,349,353 A | * | 8/1920 | Wilber, Jr. | F01C 1/44 |
| | | | | 123/227 |
| 1,405,326 A | * | 1/1922 | Powell | F01C 1/44 |
| | | | | 123/222 |
| 1,883,129 A | * | 10/1932 | Trimmer | F01C 1/46 |
| | | | | 418/176 |
| 3,759,640 A | * | 9/1973 | Hinckley | F01C 1/46 |
| | | | | 418/249 |
| 3,912,429 A | * | 10/1975 | Stevenson | F01C 1/46 |
| | | | | 418/246 |
| 3,924,976 A | * | 12/1975 | Hinckley | F01C 1/46 |
| | | | | 418/249 |
| 3,978,825 A | * | 9/1976 | Rogers | F01C 1/46 |
| | | | | 123/244 |

(Continued)

FOREIGN PATENT DOCUMENTS

| CN | 101845990 A | * | 9/2010 | |
| CN | WO 2015061923 A1 | * | 5/2015 | ............... F01C 1/44 |
| FR | 2651828 A1 | * | 3/1991 | ............... F01C 1/44 |

*Primary Examiner* — Thai Ba Trieu
(74) *Attorney, Agent, or Firm* — Wang Law Firm, Inc.

(57) ABSTRACT

A rotary engine includes: a frame; a flywheel rotor having an axle rotatably mounted on the frame; a plurality of erectable pistons respectively mounted in an annular trough concentrically recessed in a rim of the flywheel rotor; and a cylinder block fastened on a housing secured to the frame and cooperatively forming an engine cylinder with the annular trough of the flywheel rotor, whereby each erectable piston is operatively erected beyond a cylinder head of the engine cylinder to dynamically define an instant combustion chamber among the cylinder head, the cylinder block, the piston and the annular trough of the rotor; and whereby upon combustion and explosion in the combustion chamber, the (Continued)

explosion gases will force and drive the erectable piston to rotate the flywheel rotor for outputting mechanical energy.

20 Claims, 15 Drawing Sheets

(56) References Cited

U.S. PATENT DOCUMENTS

| | | | | |
|---|---|---|---|---|
| 3,988,082 | A * | 10/1976 | Rogers | F01C 1/46 418/244 |
| 4,446,829 | A * | 5/1984 | Yeager | F01C 1/46 123/244 |
| 4,990,074 | A * | 2/1991 | Nakagawa | F04C 2/44 418/172 |
| 6,619,243 | B2 * | 9/2003 | Al-Hawaj | F01C 1/44 123/43 C |
| 6,668,767 | B1 * | 12/2003 | Sanchez Talero | F01C 1/44 123/241 |
| 7,578,278 | B2 * | 8/2009 | Peitzke | F01C 1/44 123/241 |
| 7,845,332 | B2 * | 12/2010 | Wang | F01C 1/46 123/241 |
| 8,684,715 | B2 * | 4/2014 | Stegmair | F01C 1/44 418/210 |
| 2014/0261290 | A1 * | 9/2014 | Herbruck | F02B 55/08 123/200 |
| 2014/0352654 | A1 * | 12/2014 | Saba | F01C 1/44 123/200 |
| 2015/0226114 | A1 * | 8/2015 | Chou | F02B 53/10 123/207 |

* cited by examiner

ROTARY ENGINE

RELATED APPLICATION

This application claims the benefit of a Taiwanese patent application, 102128794, filed on Aug. 12, 2013, the specification of which is incorporated here by this reference.

BACKGROUND OF THE INVENTION

US 2010/0263622 also invented by the present inventor disclosed a rotary engine including one or plural combustion chambers formed around a turbine, and a movable plate formed adjacent to an opening of the combustion chamber rotated in a right angle and protruded from the turbine, whereby when the engine is operated for explosion in the combustion chamber, the movable plate will drive the turbine to rotate for producing mechanical energy.

However, such a prior art has defects such that an inside friction may occur between the rotatable movable plate (23) and the steady groove (31) of the slide member (3), therefore requiring an increased clearance to prevent friction and thereby consuming much energy of combustion to decrease the engine efficiency. Meanwhile, each movable plate (23) is pivotally mounted to the turbine (2) merely at a plate bottom portion. The explosion force after combustion will majorly impact upon the plate bottom portion of the movable plate to easily deform the movable plate to possibly cause shut-down of the engine operation.

The present inventor has invented the present rotary engine to improve the structure and efficiency of the rotary engine.

SUMMARY OF THE INVENTION

The object of the present invention is to provide a rotary engine including: a frame; a flywheel rotor having an axle rotatably mounted on the frame; a plurality of erectable pistons respectively mounted in an annular trough concentrically recessed in a rim of the flywheel rotor; and a cylinder block fastened on a housing secured to the frame and juxtapositionally cooperatively forming an engine cylinder with the annular trough of the flywheel rotor, which is rotatably slidably engaged with the cylinder block, whereby each erectable piston is operatively erected beyond a cylinder head of the engine cylinder to dynamically define an instant combustion chamber among the cylinder head, the cylinder block, the piston and the annular trough of the rotor; and whereby upon ignition of a fuel and air as fed into the combustion chamber to cause explosion of a fuel and air mixture, the explosion gases will force and drive the erectable piston to rotate the flywheel rotor for outputting mechanical energy through the axle of the rotor.

DETAILED DESCRIPTION

Figure 1:
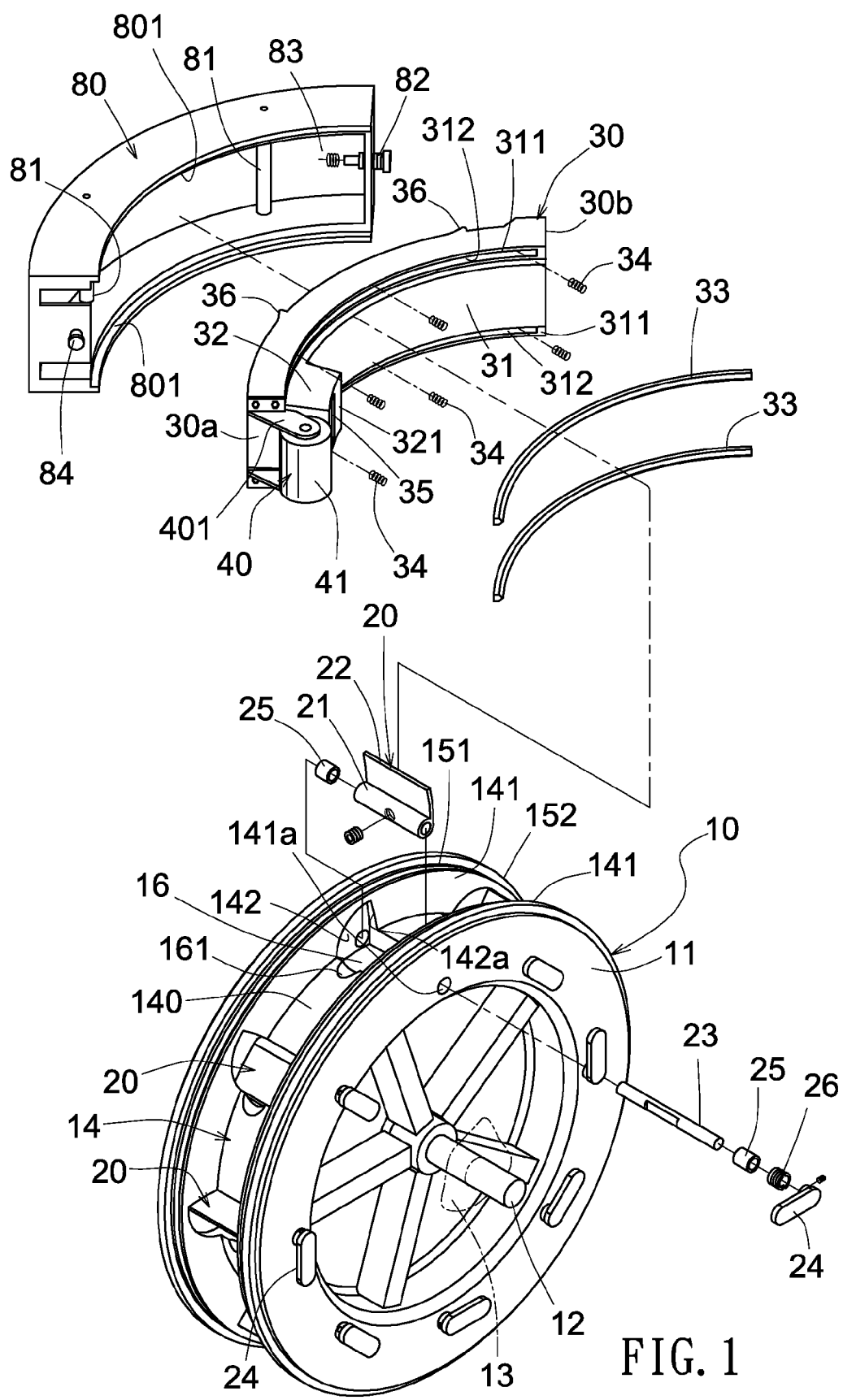
FIG. 1 is an exploded view of the present invention.
Figure 2:
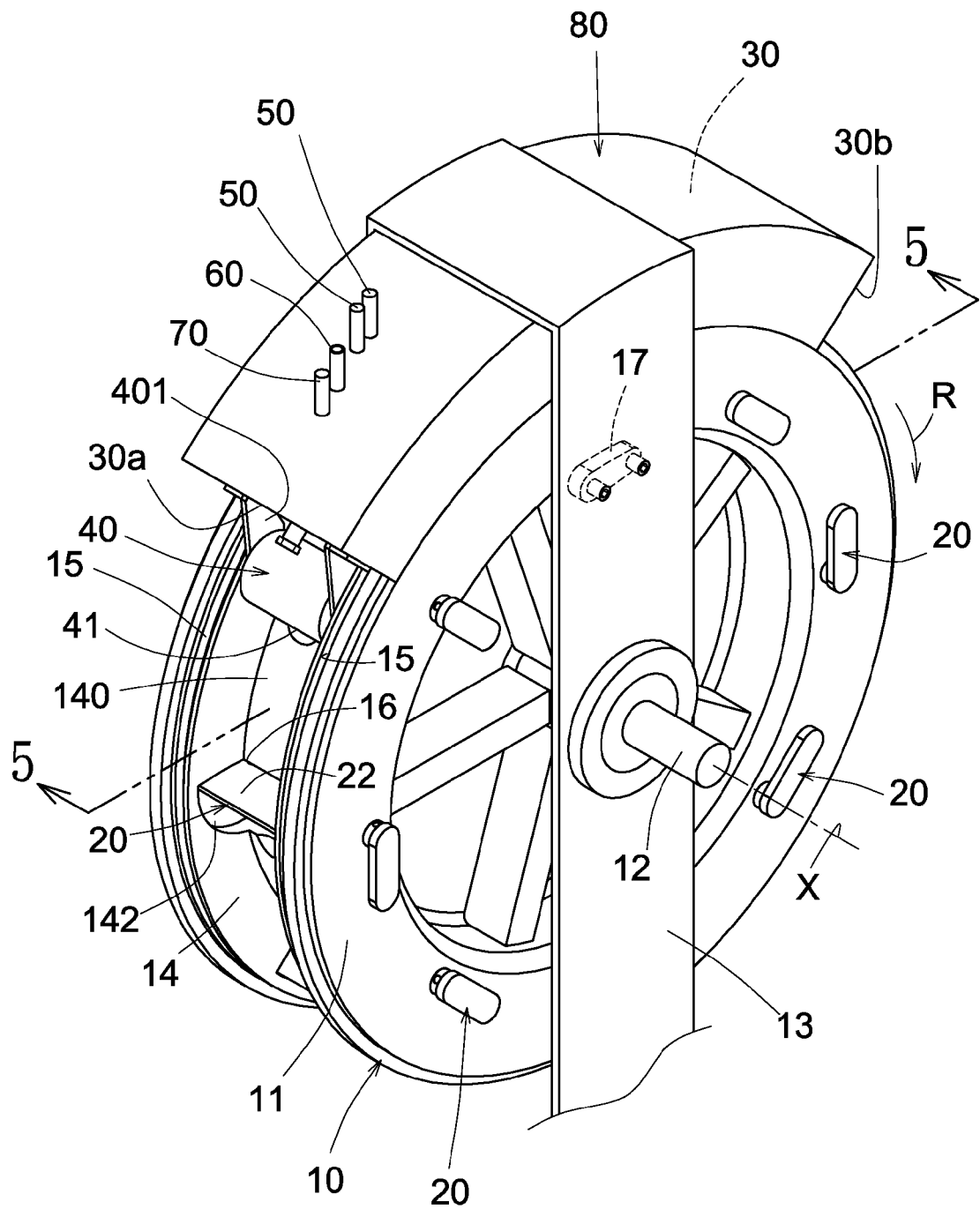
FIG. 2 is a perspective view of the present invention as assembled.

As shown in FIGS. 1~9, a rotary engine of the present invention comprises: a frame 13; a flywheel rotor 10 secured to an axle 12 rotatably mounted on the frame 13 around an axle axis X; a plurality of erectable pistons 20 respectively circumferentially secured in an annular trough 14 concentrically recessed in a rim 11 concentric to the axle axis X; a cylinder block 30 fastened on a housing 80 fixed on the frame 13, and juxtapositionally cooperatively forming an engine cylinder 100 with the annular trough 14 of the flywheel rotor 10 dynamically instantly, with the annular trough 14 rotatably slidably engaging with the cylinder block 30 juxtaposed to the rim 11 of the flywheel rotor 10; and an instant combustion chamber C instantly dynamically formed in the engine cylinder 100 as defined among a cylinder head 32 formed on a feeding end 30a of the engine cylinder 100, the cylinder block 30, each erectable piston 20 as raised by an erecting means 17 fixed on the frame 13 beyond the cylinder head 32, and the annular trough 14 in the rim 11 of the flywheel rotor 10, whereby upon injection or supply of fuel and air into the combustion chamber C, and upon ignition of a mixture of the fuel and air to cause explosion in the combustion chamber C, the explosion gases will force and drive the erectable piston 20 to rotate the flywheel rotor 10 and axle 12 for outputting mechanical energy through the axle 12; and whereby the waste gases after combustion will be discharged outwardly through an exhaust port E formed on an exhausting end 30b of the engine cylinder 100.

During the operation of the present invention, the relative movement and friction between the synchronously operating erectable piston 20 and the annular trough 14 is eliminated. The contacting area between the vane 22 of each piston 20 and an outer wall 31 of the cylinder block 30 is minimized and greatly decreased than the contacting area between the movable plate (23) and the slide member (3) of the prior art (US 2010/0263622). In other words, a complex mechanism for the heat re-use and without any oil lubricate on the annular trough 14, therefore, the output of air pollution will be decrease for the present invention and thereby increase the engine efficiency of the present invention.

The annular trough 14 includes: a bottom wall 140 concentrically recessed radially in the rim 11 of the flywheel rotor 10, and a pair of side walls 141 formed on opposite sides of the annular trough 14 and diverging radially outwardly from the bottom wall 140 to form an inversed trapezoid shape.

A plurality of receiving cavities 16 are equally spaced and circumferentially recessed in the bottom wall 140 of the annular trough 14, each receiving cavity 16 provided for accommodating each erectable piston 20 therein.

Each erectable piston 20 (FIGS. 1, 3, 4, 5~9) includes: a vane 22 having a sleeve portion 21 secured to a pivot 23 (such as by a screw), and a lever 24 angularly secured to the pivot 23 to projectively define a right or acute angle A between the lever 24 and the vane 22; with the pivot 23 pivotally mounted in a pair of bearings (or bushings) 25 fixed in the side walls 141 of the annular trough 14 of the rim 11, having a retainer 26 retained on a side opening 141*a* of the rim 11 for limiting one said bearing 25 for stably mounting each piston 20 in each receiving cavity 16. The retainer 26 may be formed with threads 261 thereon to be engaged with the threaded opening 141*a*.

The number of pistons 20 and cavities 16 are not limited in the present invention, even eight pistons 22 and cavities 16 being shown in the drawings.

Figure 4:
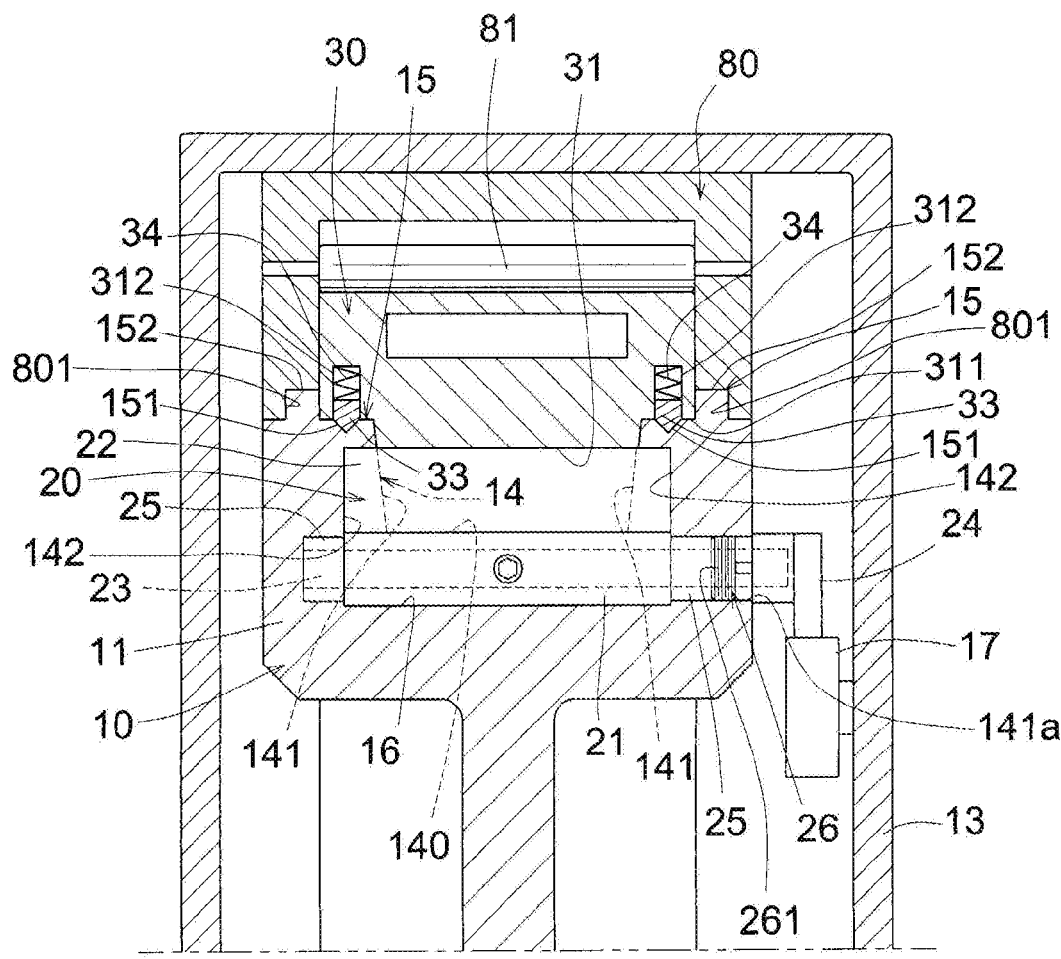
FIG. 4 is a sectional drawing as viewed from Line 4-4 of FIG. 3.

The lever 24 is externally connected with the pivot 23 of the piston 20, as positioned outside the annular trough 14, to be rotatably passed through a space between the frame 13 and the rim 11 of the flywheel rotor 10 (FIG. 4).

The pivot 23 of the piston 20 is rotatably mounted in a first end 16*a* of the receiving cavity 16 recessed in the trough 14 to allow the vane 22 to be engageable in a pair of fan-shaped recesses 142 recessed in opposite side walls 141 of the trough 14; whereby upon being raised by an erecting means 17 secured on the frame 13 beyond a cylinder head 32 of the engine cylinder 100, the vane 22 of each piston 20 will be erected clockwise (C1) from a retracted position at a second end 16*b* of the receiving cavity 16 (such as from FIG. 7 to FIG. 8) until being retarded on a limiting edge 142*a* (FIGS. 1, 7 and 8) of each recess 142. The vane 22 thus erected will be pushed or driven during the explosion step as shown in FIG. 8, which will be further described in detail as hereinafter.

The first end 16*a* and the second end 16*b* are numbered and designated in a relative relationship when the flywheel rotor 10 is rotated clockwise R as shown in the figures, for instance, as rotated from "position 16*a*" to "position 16*b*" clockwise as shown.

The vane 22 of the piston 20, when approximating (prepared for entering) the cylinder head 32 of the cylinder 100, will be retracted counter-clockwise (C2) (FIG. 7~FIG. 8) from a first end 16*a* towards a second end 16*b* by a retracting means 40, which is secured to and positioned in front of the cylinder head 32 to be received into the receiving cavity 16.

Figure 6:
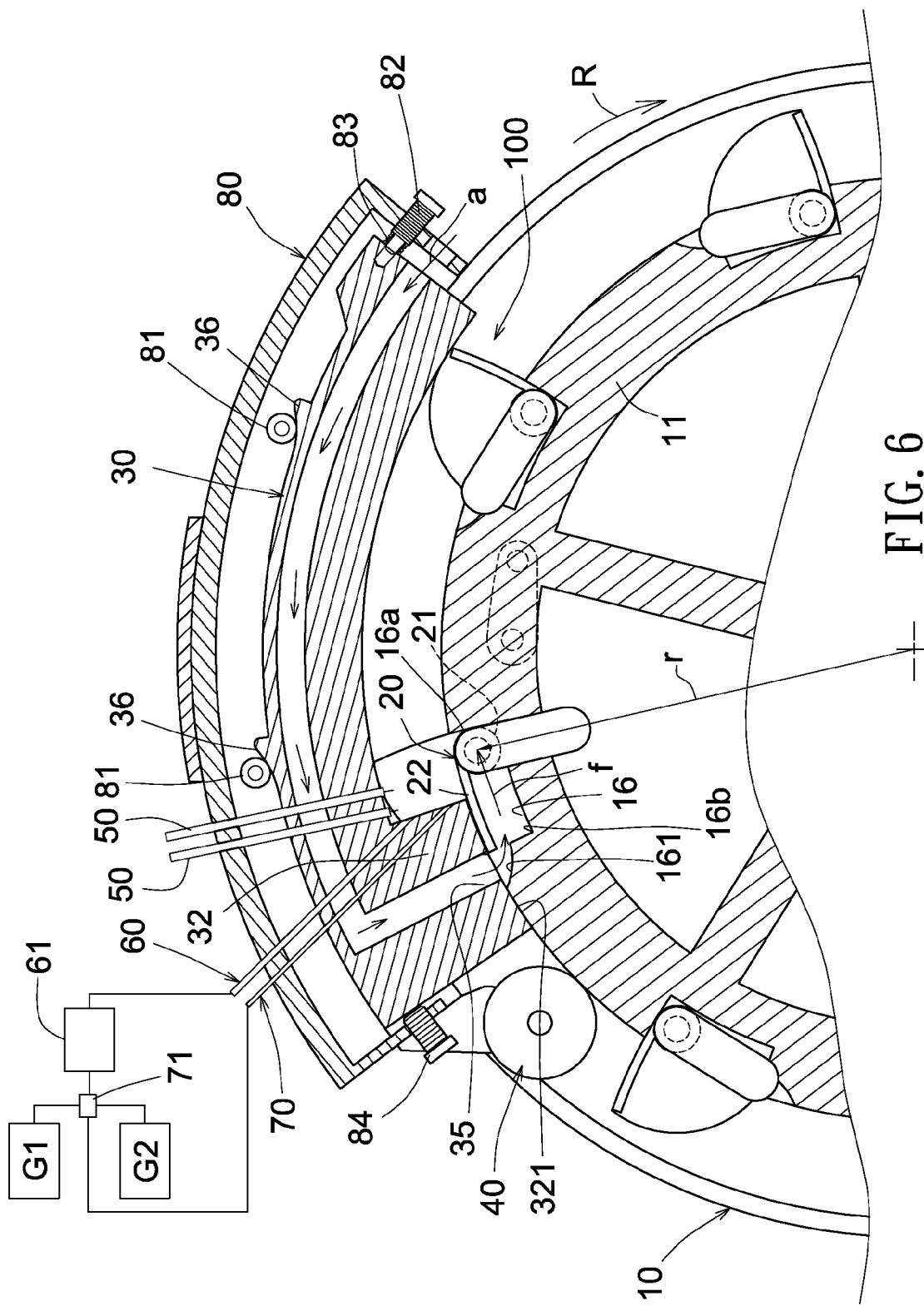
FIG. 6 shows a second step following FIG. 5.

The receiving cavity 16 includes an air inlet port 161 formed in a feeding end of the cavity for leading air (a) into the cavity 16 when delivered through an air passage 35 formed through the cylinder head 32 and cylinder block 30 (FIG. 6). The air (a) may be supplied and compressed by a compressed air supply source or offer an air compressor to string together with the same shaft (not shown).

Figure 7:
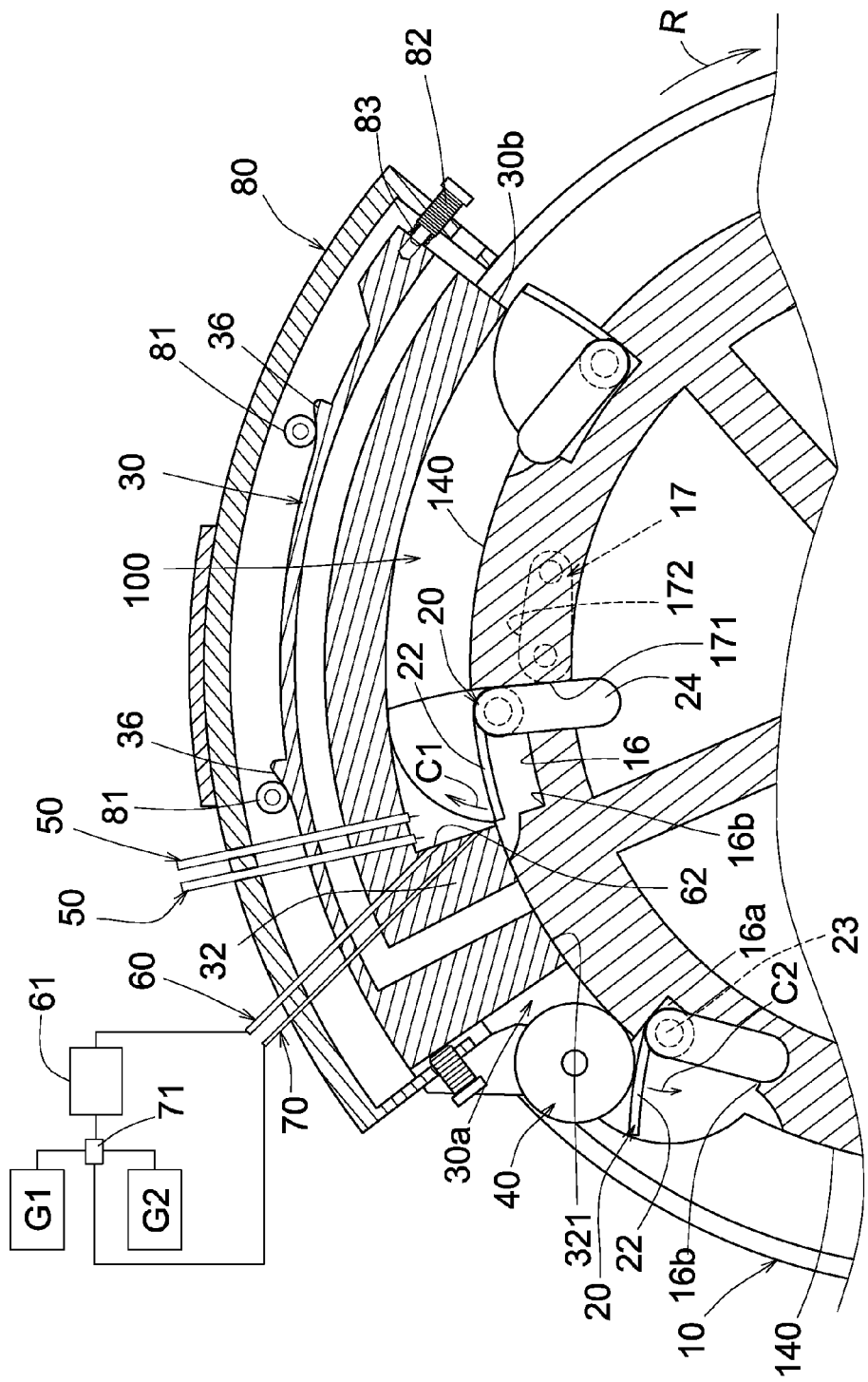
FIG. 7 shows a third step following FIG. 6.
Figure 8:
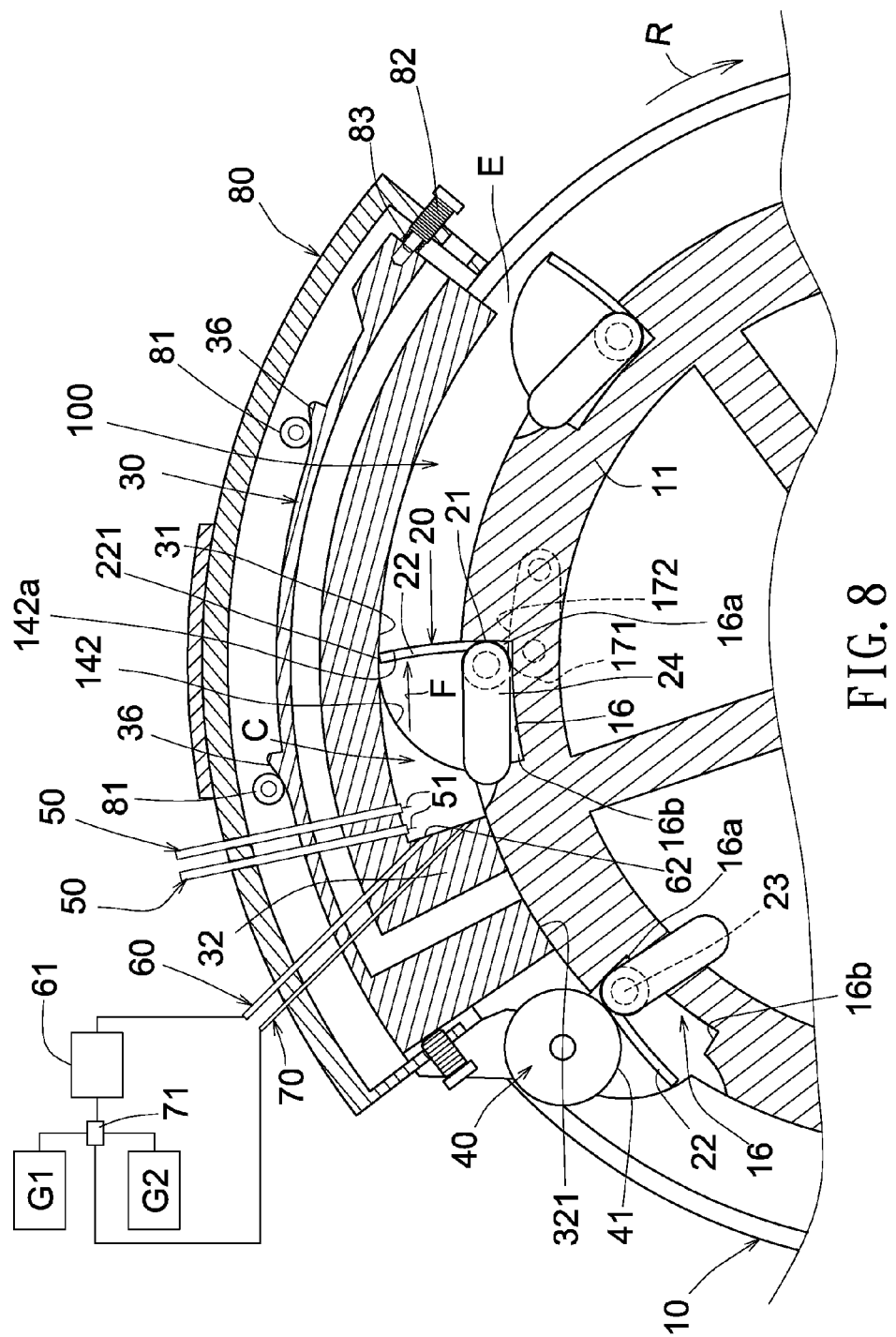
FIG. 8 shows a fourth step following FIG. 7 for explosion in the combustion chamber of the present invention.

The air inlet port 161 should not be "covered" by the vane 22 when retracted into cavity 16 to allow the feeding of air (a) into the cavity 16 for subsequent combustion process in the combustion chamber C (FIG. 6~FIG. 8).

Figure 9:
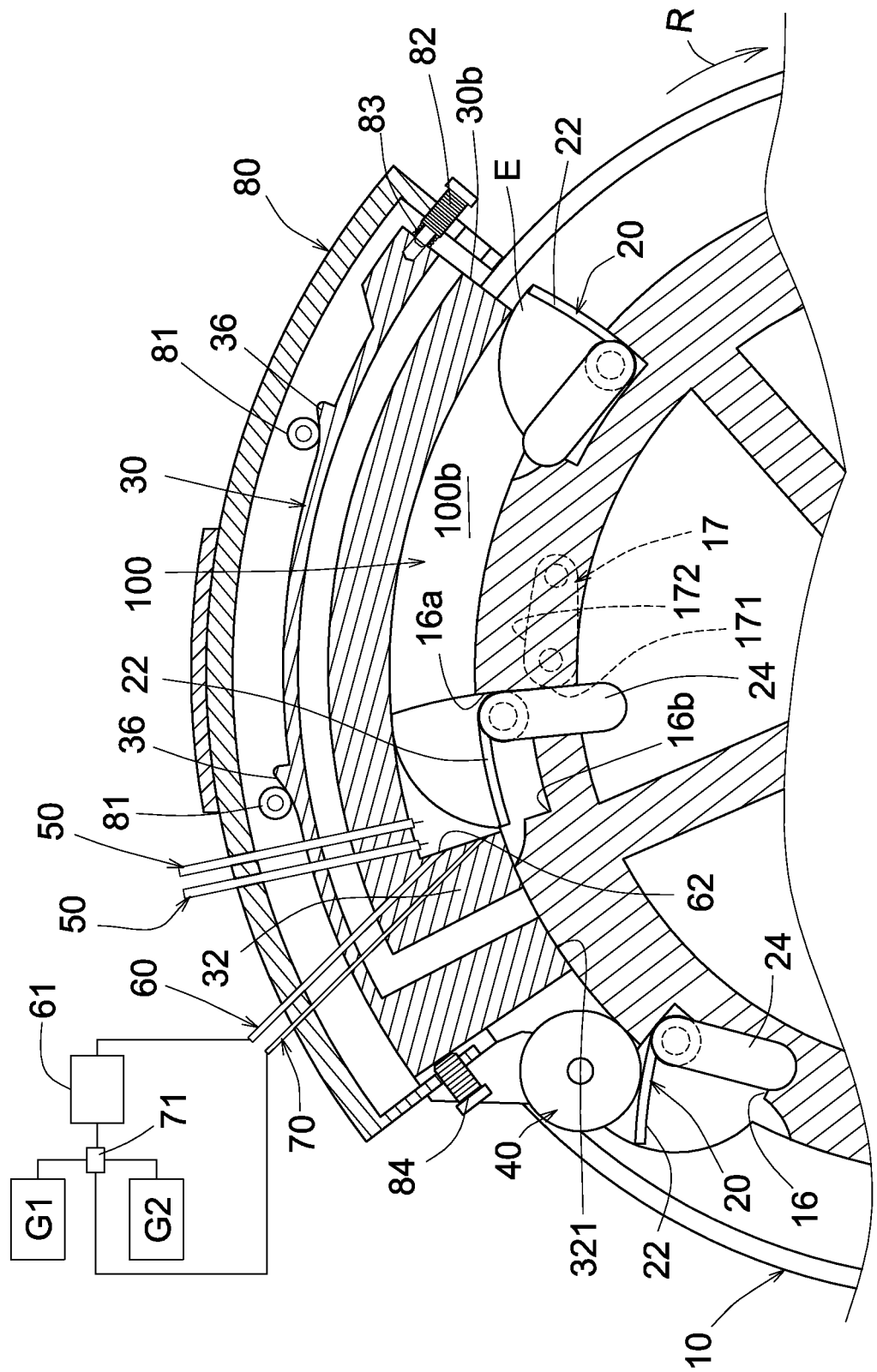
FIG. 9 shows a fifth step following FIG. 8.

The retracting means 40 may include a roller rotatably mounted in a bracket 401 secured to and positioned in front of the cylinder head 32, having a roller periphery 41 rotatably and tangentially engageable with the bottom wall 140 of the annular trough 14, adapted to retract the vane 22 of the piston 20 downwardly inwardly to be received in the receiving cavity 16 in order to enter the cylinder head 32 (FIGS. 7~9).

The erecting means 17 (FIGS. 2, 3, 7 and 8) may include a cam secured to the frame 13 adjacent to the cylinder head 32 of the engine cylinder 100, a round end 171 formed on a front end of the cam and operatively biasing the lever 24 of the piston 20 about the pivot 23 when the rotor 10 is rotated to erect the vane 22 upwardly outwardly (FIG. 7~FIG. 8), and a flat seat portion 172 formed on a top of the cam to be ridden thereon by the lever 24 (FIG. 8) when the rotor 10 is rotated, thereby helping an initial stable erection of the vane 22 to be reliably "blown" by the explosion gases upon ignition in the combustion chamber C.

The cylinder block 30 is generally formed as an arcuate shape concentric to the axle axis X and fastened to a housing 80 secured to the frame 13. The cylinder block 30 is a major "part" of the engine cylinder 100 of the present invention. The cylinder block 30 is juxtaposed to the rim 11 of the flywheel rotor 10 rotatably mounted on the frame 13.

For explanation convenience, the cylinder head 32 is integrally formed as a "part" of the cylinder block 30 in the present invention. Also, the engine cylinder 100 is not a statically fixed structure since the engine cylinder 100 is instantly or dynamically formed by cooperatively defining the cylinder block 30, the cylinder head 32, and the annular trough 14, which is rotatably slidably engaged with the cylinder block 30 and the cylinder head 32, as the so-called "engine cylinder 100". The engine cylinder 100 may be defined between the feeding end 30*a* and the exhausting end 30*b*, having air and fuel fed into the engine head 32 at the feeding end 30*a*, while having the combustion waste gases discharged outwardly through an exhausting port E at the exhausting end 30*b*.

Figure 5:
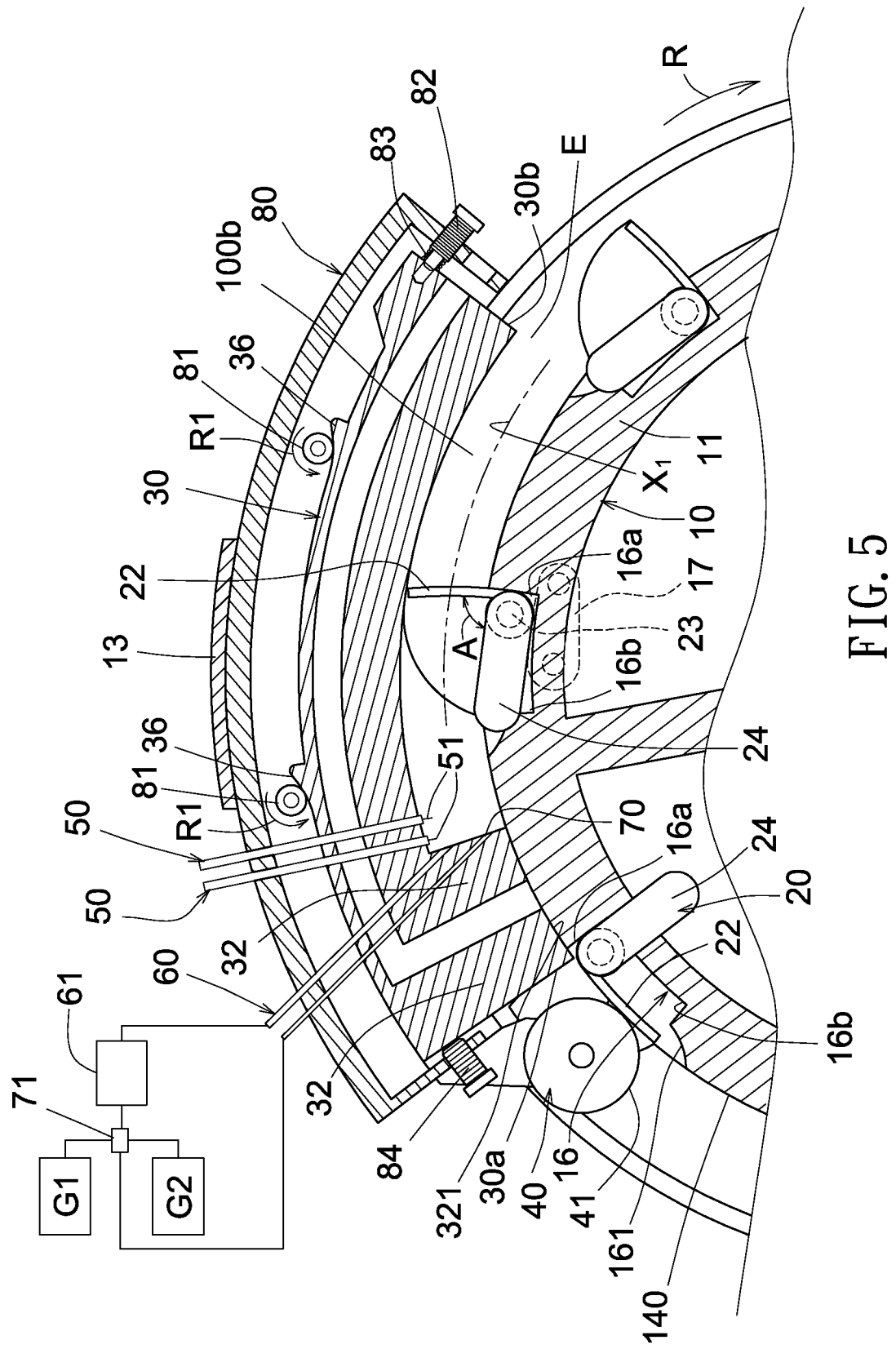
FIG. 5 is a partial sectional drawing of the present invention showing a first step of the engine operation.

The cylinder block 30 includes: the cylinder head 32 formed at the feeding end 30*a*, and an outer wall 31 arcuately formed in the cylinder block 30 about the axle axis X, a longitudinal axis X1 (FIG. 5) arcuately formed in the engine cylinder 100 as concentric about the axle axis X, with the vane 22 of each piston 20 erectably slidably engageable with the outer wall 31 of the cylinder block 30 during the operation of the rotary engine of the present invention, and the vane 22, when erected, being generally perpendicular to the longitudinal axis X1 (FIG. 5).

The cylinder head 32 includes an arcuate bottom portion 321 engageable with the bottom wall 140 of the annular trough 14, having an air passage 35 formed through the arcuate bottom portion 321 of the cylinder head 32 and the cylinder block 30 for leading compressed air (a) into each receiving cavity 16 through an air inlet port 161 formed in a front end of the receiving cavity 16.

Figure 3:
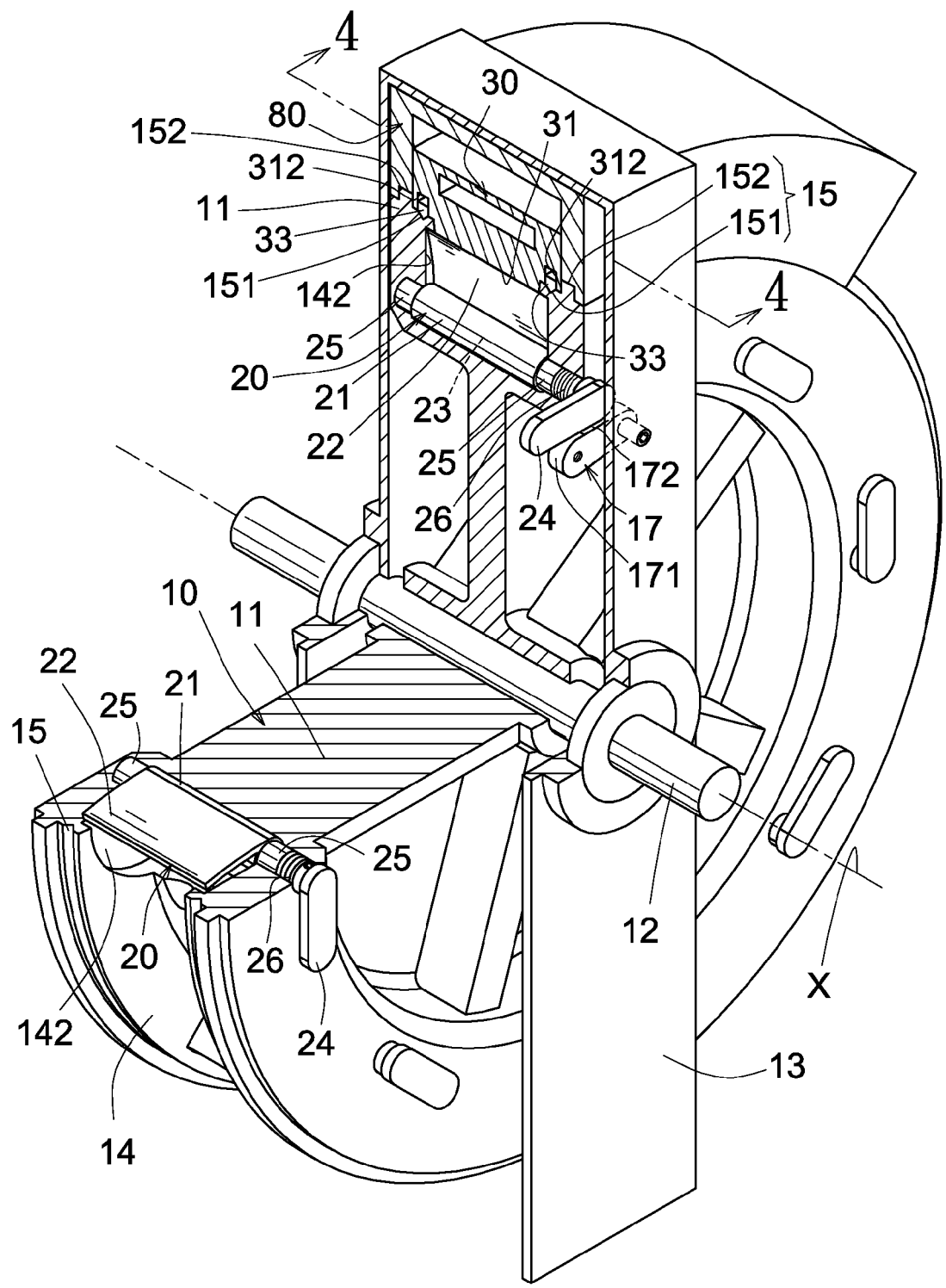
FIG. 3 is a partial cut-away illustration of the present invention.

The cylinder block 30 is engageable with the annular trough 14 of the rim 11 of the flywheel rotor 10. For preventing air or gas leakage, the rim 11 includes a pair of annular grooves 151 respectively annularly recessed in a pair of shoulder portions 15 of the rim 11 to be engageable with a pair of sealing strips 33 resiliently retained in a pair of sliding grooves 312 respectively annularly recessed in a pair of side extensions 311 formed on opposite sides of the cylinder block 30, each sealing strip 33 urged by a plurality of springs 34 retained in each sliding groove 312 (FIGS. 1, 3, 4).

The engine cylinder 100 includes: an igniter 50 having igniting terminals (or electrodes) 51 protruding into a combustion chamber C adjacent to the cylinder head 32 for igniting a mixture of fuel and air in the combustion chamber; a fuel system 60 having nozzles 62 for injecting or spraying fuel into the combustion chamber C from the fuel reservoir G1 or G2 by a fuel pump 61; and a thermoelectric couple 70 protruding into the combustion chamber C for sensing the operating temperature in the combustion chamber C, having a controller (or control valve) 71 connected between the fuel reservoir G1, G2 and the fuel pump 61 for selectively pumping a specific fuel (selected from G1 or G2) having a point of combustion most related to (or suitable for) the operating temperature as sensed in the combustion chamber.

The cylinder block 30 is fastened or secured to the housing 80 fixed on the frame 13, and the cylinder block 30 is also slidably engageable with the rim 11 of the flywheel rotor 10 by rotatably slidably engaging a pair of side flanges 801 formed on opposite sides of the housing 80 with a pair of annular extensions 152 respectively annularly formed on opposite shoulder portions 15 on the rim 11 (FIG. 4) for stably mounting the rotor 10, the cylinder block 30 and the housing 80 on the frame 13.

The housing 80 includes: a plurality of retaining pins 81 each engaged with a wedge portion 36 formed on the cylinder block 30, an adjusting screw 82 formed on the first end of the housing 80 for urging a first end of the cylinder block 30 as resiliently or expansively forced by a compression spring 83 retained between the cylinder block 30 and the adjusting screw 82 of housing 80. To increase or decrease the force from the spring 83 to push the first end of the cylinder block 30, such a force, as aided by the wedge portion 36 as relatively thrusted by the pin 81, will be converted into a centripetal thrust force to close the block 30 towards the rotor 10. In order to keep the gas tightness between the cylinder block 30 and the flywheel rotor 10, a proper spring force is required. If the spring force is not well set up, it may make the engine out of order, especially when considering the heating expansion and cooling contraction of the engine. Therefore, it is very important to allow the adjusting screw 82 to exert a proper force or pressure. When the tightness has been increased between the cylinder block 30 and the flywheel rotor 10, it will be automatically released by retracting the cylinder block 30 to reduce their friction contact so that the flywheel rotor 10 can be smoothly rotated. Upon driving of the stopping screw 84 to make an optimum clearance between the cylinder block 30 and the flywheel rotor 10, the engine will be placed for well operation and in due course. A gas-tightness is obtained by slidably engaging the sealing strips 33 with the annular grooves 151. The stopping screw 84 serves to retard any reaction or recoiled force acting on the cylinder head 32 of the cylinder block 30, when driven by the adjusting screw 82 to push the cylinder block 30 in the housing 80. The retaining pin 81 may be formed as a roller pin and is rotated in a single direction by a single-direction bearing or ratchet, namely rotated counter-clockwise R1 opposite to a clockwise rotation R of the flywheel rotor 10. After being operatively rotated, the engine is heated or expanded, and the cylinder block 30 will be kept in sound condition to be always slidable with the flywheel rotor 10 without any friction between them. But when the thermal expansion is increased to synchronously increase the friction between the cylinder block 30 and the flywheel rotor 10, both the cylinder block 30 and flywheel rotor 10 will be cooperatively rotated temporarily. At this time, the wedge portion 36 will be retracted smoothly by synchronously rotating the flywheel rotor 10 clockwise and rotating the pin 81 counter-clockwise R1 as shown in FIG. 5. However, when the explosion occurs to thrust, with centrifugal force, the cylinder block 30 outwardly, the wedge portion 36 will then be tightly engaged with a bottom periphery of the pin 81, and the wedge portion will be stably limited by the pin 81 which can not be rotated clockwise (opposite to the direction of R1). By the way, the flywheel rotor 10 will then be free rotated without being frictionally coupled with the block 30.

The screw 84 may adjustably thrust the second end of the block 30 so as to adjust the corresponding relationship between the wedge portion 36 of block 30 and the pins 81 of the housing 80. Therefore, a clearance allowance between the block 30 and the flywheel rotor 10 may be adjusted to be within a pre-set range of clearance whenever finished by a factory manufacturing.

The receiving cavity 16, besides its function for accommodating the vane 22 of the piston 20 when retracted, will also serve as an "air (or oxygen) carrier" to serve as a temporary air storage as fed air therein (FIG. 6) to be "shipped" to the combustion chamber C (FIG. 7 to FIG. 8) for combustion purpose.

The fuel stored in first reservoir G1 may serve to provide a light fuel such as gasoline when the thermoelectric couple 70 senses a lower temperature in the combustion chamber C, thereby actuating the controller 71 to open a control valve for pumping the lighter fuel (G1) into the combustion chamber. Comparatively, when the thermoelectric couple 70 senses a higher temperature, it may actuate the controller 71 to pump a heavier fuel (G2) into the combustion chamber. The controller may be used as a preset system by a scale of temperature.

The air (a) pass through an heat exchanger (not shown) when fed into the cylinder block 30 for helping a complete combustion of the fuel as mixed with the air. Such a heat exchanger for pre-heating the air and/or fuel may be built in front of the cylinder block 30, but not limited in this invention.

The operation of the present invention is now described as follows:

1. The flywheel rotor 10 is started, such as by a starting motor (not shown), to rotate clockwise R as shown in FIG. 5.
2. As shown in FIG. 6, the rotor 10 is rotated to align the inlet port 161 of the receiving cavity 16 with the air passage 35 to feed compressed air (a) into the cavity 16. The pressure force f of the compressed air will help push the first end 16a of the cavity 16 to further rotate the rotor by a moment of f×r wherein "r" is the radius of the rotor.
3. The rotor is rotated from FIG. 6 to FIG. 7 to allow the lever 24 of the piston 20 to be impacted against the round end 171 of the erecting means 17. The lever 24 is thus biased to raise the vane 22 upwardly or radially in a direction C1 (from FIG. 7 to FIG. 8) to temporarily or instantly define a combustion chamber C as confined among the vane 22, the cylinder head 32, the outer wall 31 of the cylinder block 30, and the annular trough 14 of the rotor 10. At this time, the air as carried in the cavity 16 will be spread into the combustion chamber C, wherein the fuel is fed therein through the fuel system 60.
4. By igniting the fuel mixed the air by the igniter 50 to cause explosion in the combustion chamber C, the explosion force F by the explosion gases after combustion will drive the vane 22 of the piston 20 to rotate (R) the flywheel rotor 10 accordingly (FIG. 8). The piston 20 will be driven to run its stroke in the cylinder bore 100b of the engine cylinder 100 and the waste combustion gases will be discharged outwardly through the exhausting port E as shown in FIG. 9.
5. As shown in FIG. 9, a next vane 22 will be retracted into cavity 16 by the retracting means 40 before entrance into the cylinder head 32 for a next combustion cycle.

Upon erection of the vane 22 of the piston 20, the vane 22 will be retarded on the limiting edges 142*a* (FIG. 8) to stably form such a combustion chamber C temporarily as aforementioned.

The outer edge 221 of the vane 22 will be slidably engageable with the outer wall 31 in the cylinder block 30 to form such an efficient combustion chamber C and cylinder bore 100*b* during the engine operation.

When the air as carried in the cavity 16, the cylinder head 32 (especially the bottom portion 321) may serve as a "valve" (FIG. 6~FIG. 7) to well keep the air in the cavity 16, until the vane 22 is erected, whereby the air will be spread from the cavity into the combustion chamber C (FIG. 8) ready for ignition and combustion therein. The air as carried in the cavity 16 will be quantitative since the recessed volume in cavity 16 is constant, thereby enhancing a stable combustion in the chamber C. This is so good for an engine because too much air (too lean) may not run properly, while less air may cause incomplete combustion, wasting fuel and causing air pollution.

The heat exchanger (not shown) may be provided for pre-heating the air or fuel just at the every beginning of the engine operation. After continuous operation of the present invention, the heat caused by the combustion in the engine cylinder 100 may increase the temperature in the cylinder block 30 which may serve for preheating the air and fuel as fed into the combustion chamber. Naturally, the cylinder block, the cylinder head and the rim of the rotor are made of ceramic fiber, metals or alloys, better for storing or transferring the heat caused in the combustion.

In FIG. 8, when explosion caused in the combustion chamber C, most explosion gases may suddenly push and drive the vane 22 of the piston 20 to rotate the rotor 10 for doing mechanical work. Even though little gases may enter the cavity 16, it however will not influence the major work done to the piston vane 22 because the explosion force F, as backed against the "fixed" cylinder head 32, will drive the piston forwardly (rotating in direction R as shown).

The present invention may be further modified without departing from the spirit and scope of the present invention.

Figure 10:
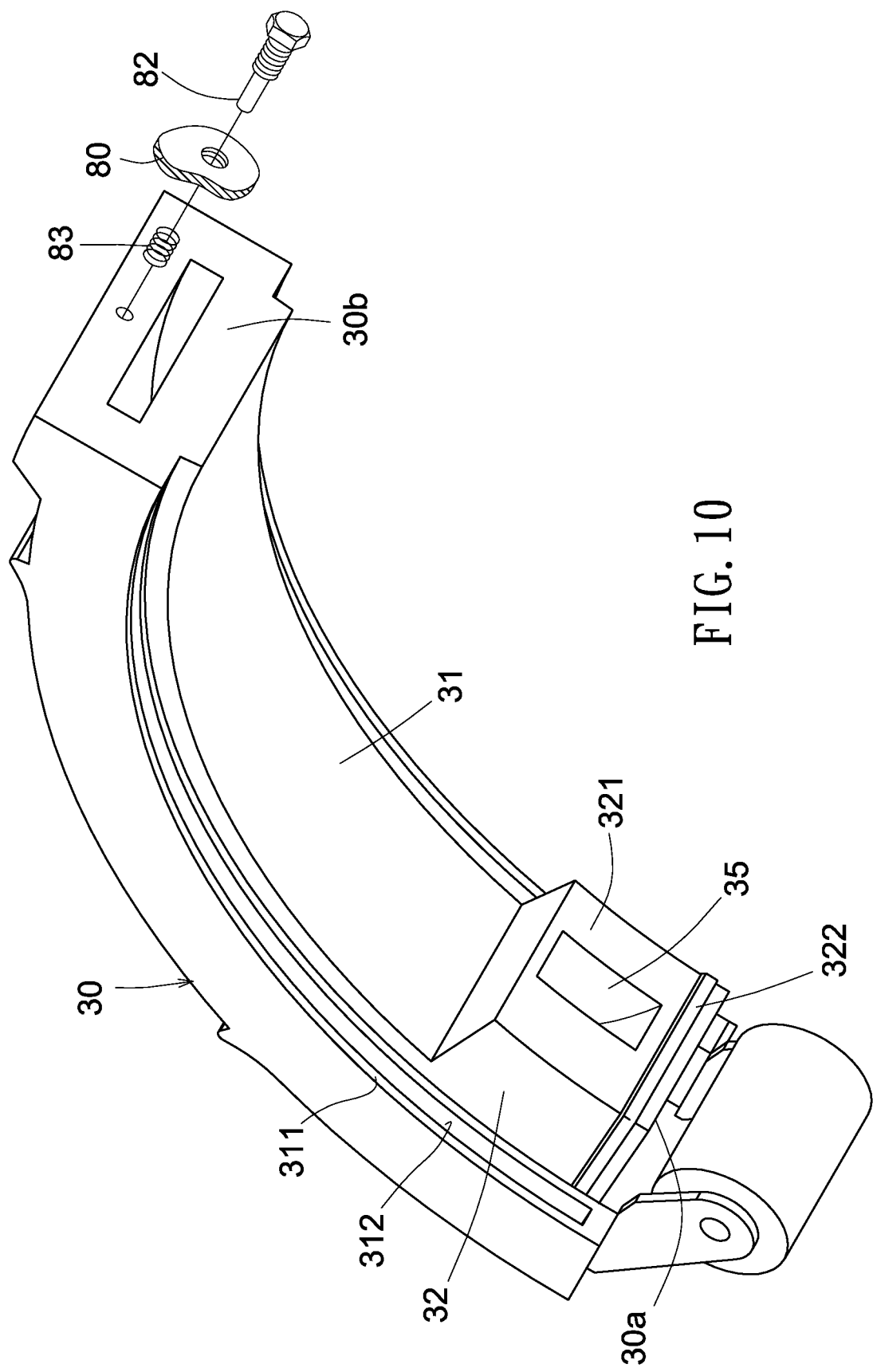
FIG. 10 is a perspective view of the cylinder block of the present invention, having the cylinder head embedded with a sealing member thereon.
Figure 11:
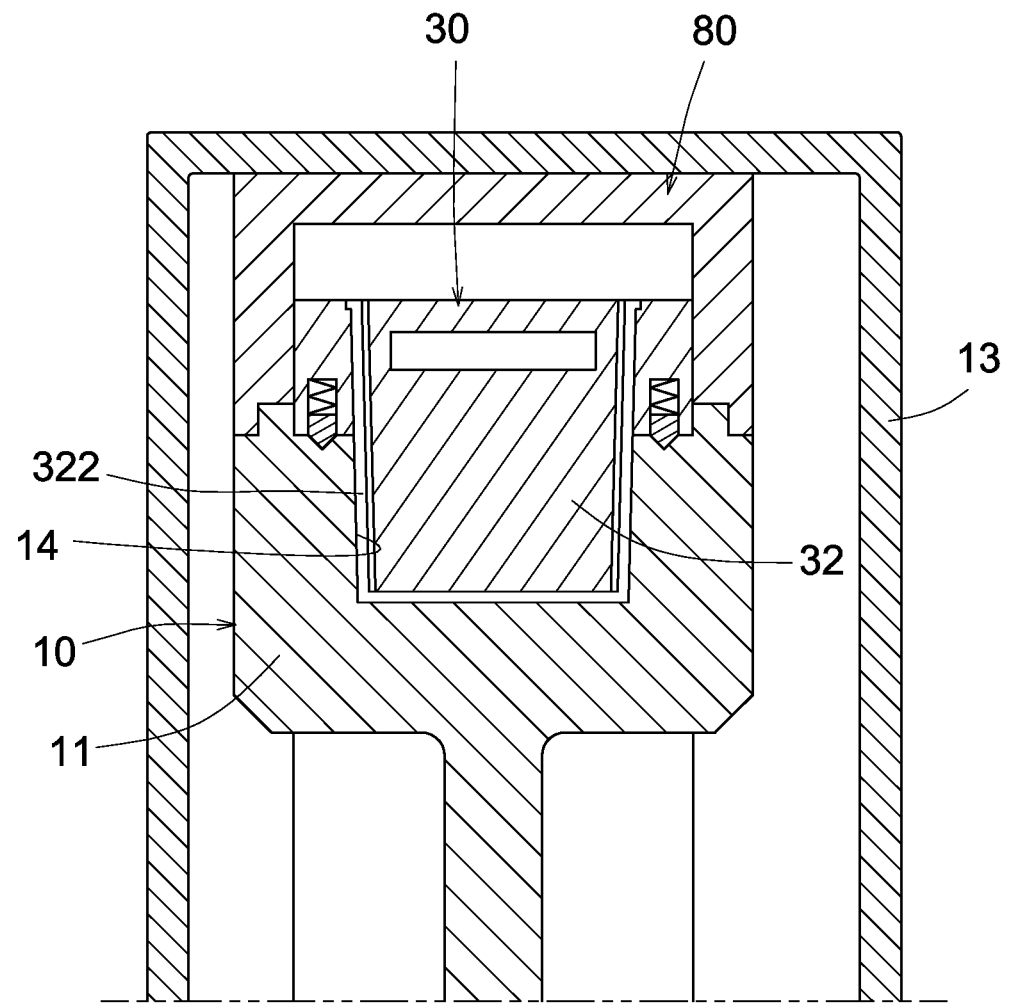
FIG. 11 is a sectional drawing of the present invention when embedding the sealing member on the cylinder head as shown in FIG. 10.

As shown in FIGS. 10 and 11, a sealing member or elastic "ring" 322 may be embedded on a bottom or side portions of the cylinder head 32 for ensuring the sealable slidable engagement with the trough 14 of the rotor rim 11.

Figure 12:
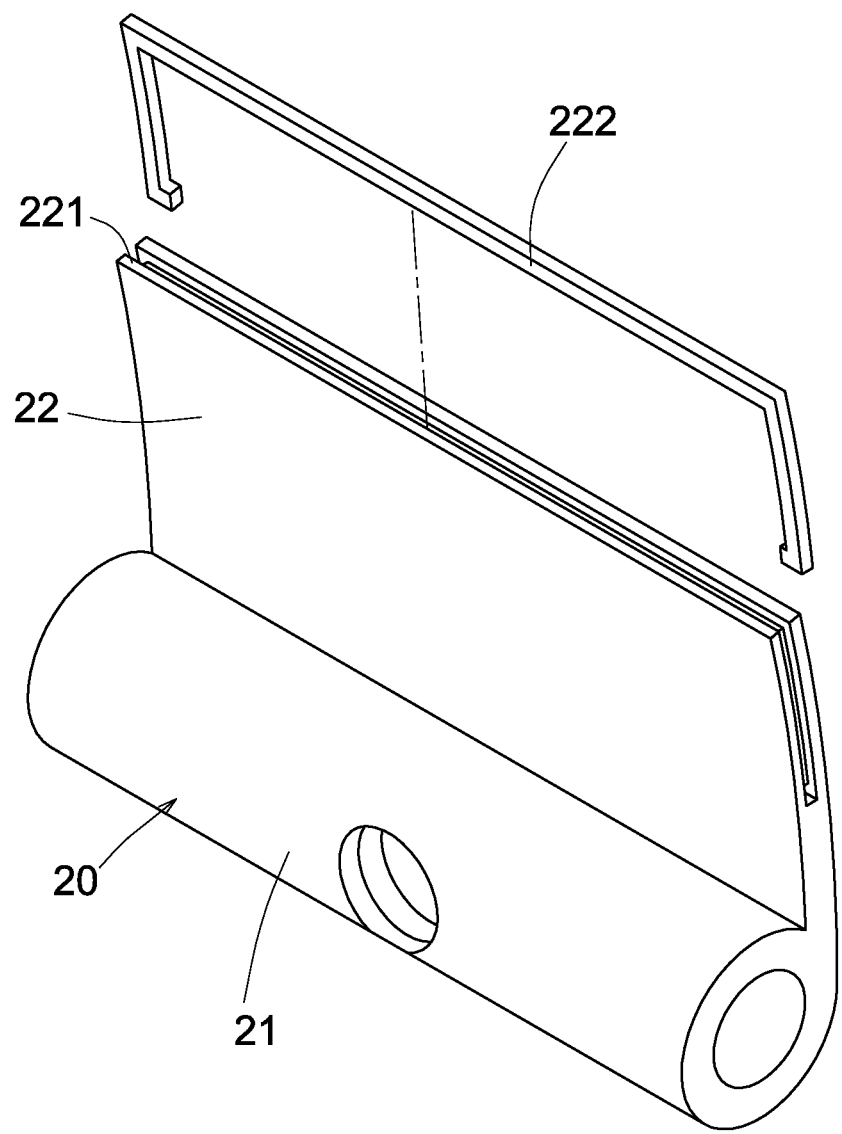
FIG. 12 shows a sealing member embedded on a vane of the erectable piston of the present invention.

As shown in FIG. 12, a sealing member or elastic "ring" 222 is embedded on a periphery 221 of the piston vane 22 for ensuring a sealable slidable engagement with the outer wall 31 of the cylinder block 30.

Figure 13:
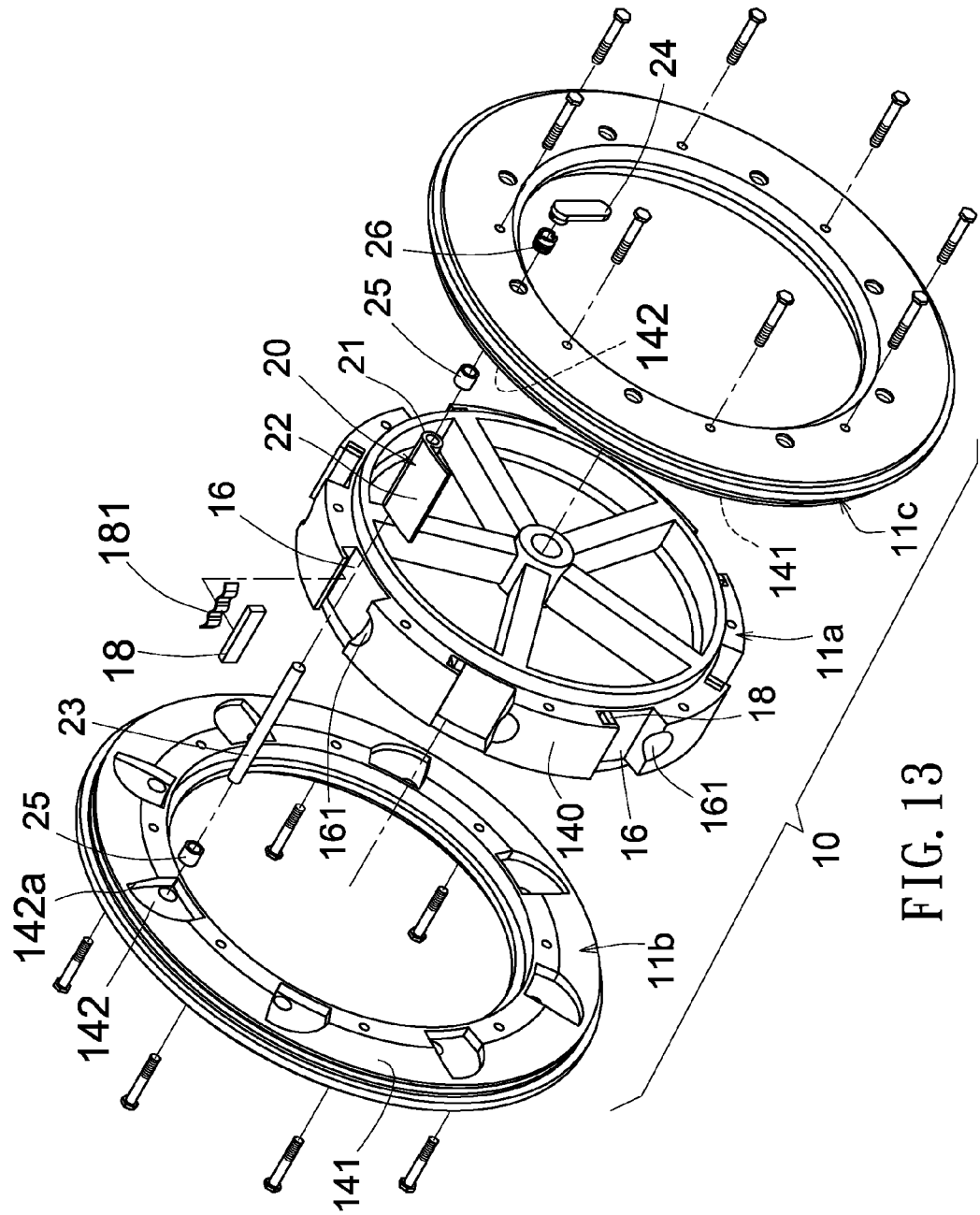
FIG. 13 is an exploded view of another preferred embodiment of the present invention, showing breakdown elements.
Figure 14:
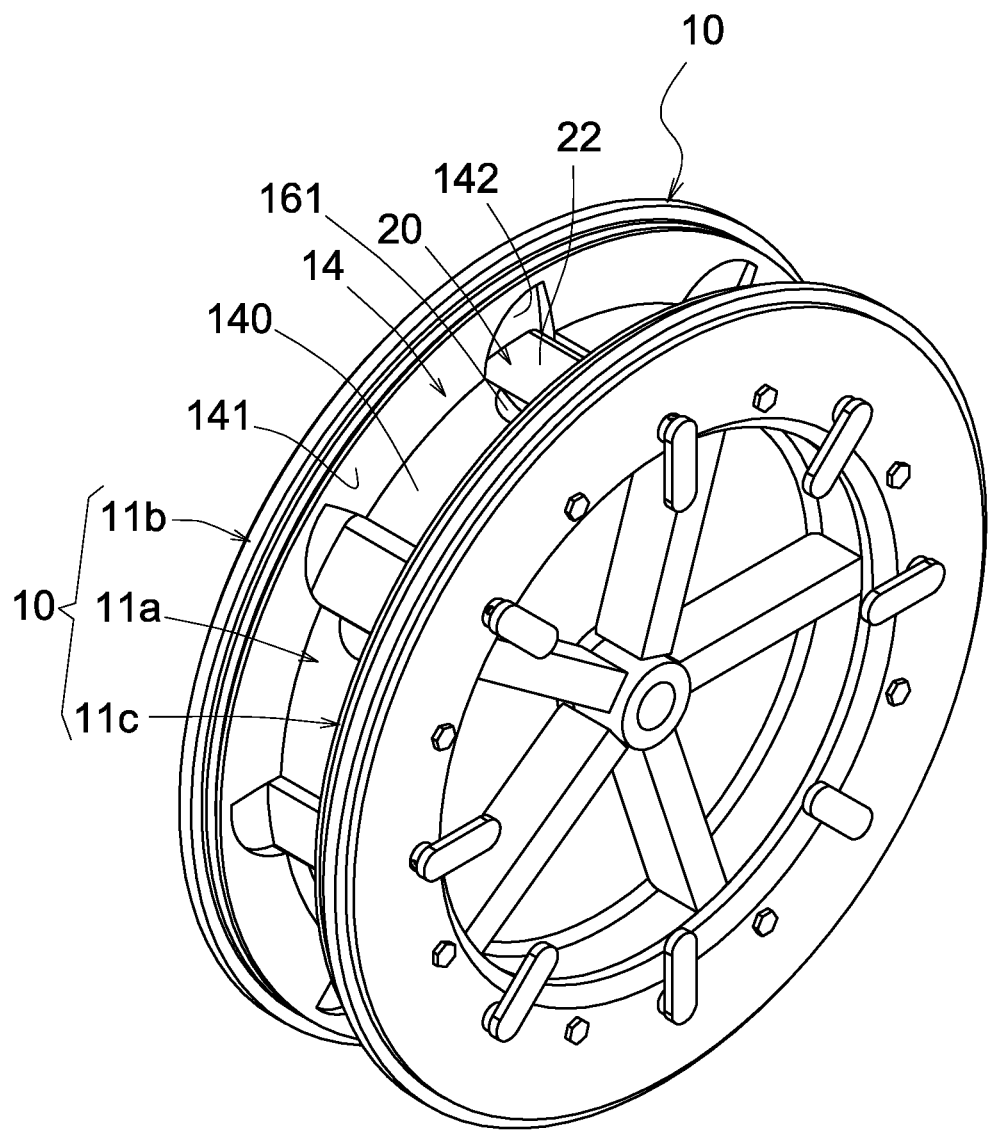
FIG. 14 is an illustration as assembled from FIG. 13.

As shown in FIGS. 13 and 14, the flywheel rotor 10 may be made to be assembled or disassembled from breakdown elements, namely, an intermediate wheel member 11*a* axially secured to the frame 13 and sandwiched in between a pair of rim members 11*b*, 11*c*, whereby upon assembly of the two rim members 11*b*, 11*c* to be disposed on opposite sides of the intermediate wheel member 11*a*, a flywheel rotor 10 will be formed. The intermediate wheel member 11*a* includes an annular bottom wall 140 annularly formed on a periphery of the intermediate wheel member 11*a*, having a plurality of receiving cavities 16 in the annular bottom wall 140. After being assembled, an annular trough 14 will be formed as defined among the two rim members 11*b*, 11*c* and the intermediate wheel member 11*a*.

Each rim member 11*b*, 11*c* includes a plurality of fan-shaped recesses 142 recessed therein for slidably guiding each vane 22 of each piston 20 respectively in each fan-shaped recess 142 as limited on the edge 142*a* in each recess 142.

Figure 15:
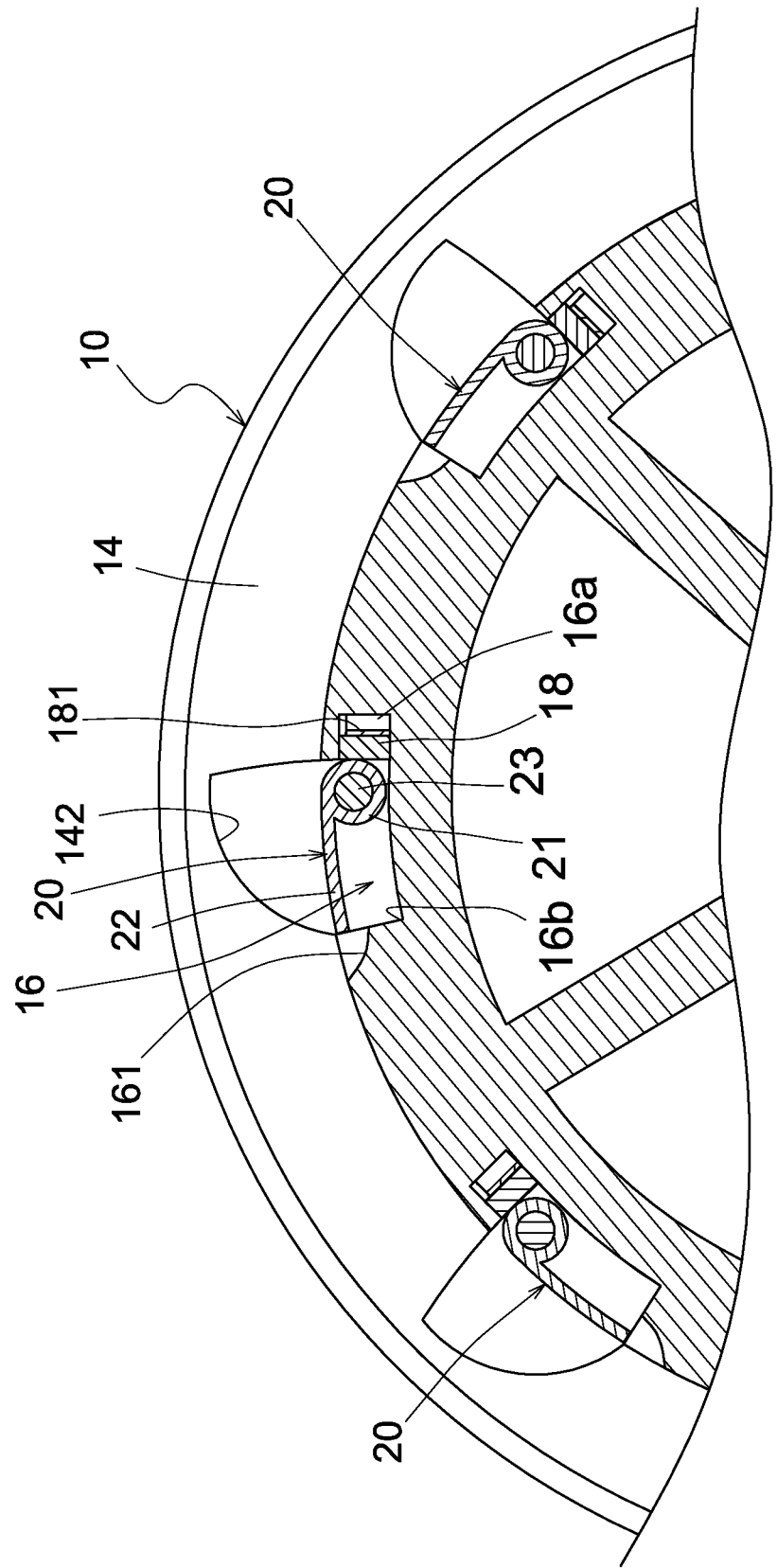
FIG. 15 is a modification of the erectable piston having sealing member urged by a spring retained in a receiving cavity of a flywheel rotor of the present invention.

As shown in FIGS. 13 and 15, a sealing member 18 forced by a spring 181 is embedded in each cavity 16 (at the first end 16*a* of the cavity) for well sealing of the piston 20 for preventing gas leakage.

The trough 14 may be formed as trapezoidal shape or any other shape. The trough 14 may have its opposite side walls 141 tapered downwardly from its upper or top edge towards the bottom wall 140.

I claim:

1. A rotary engine comprising:
    a frame;
    a flywheel rotor secured to an axle rotatably mounted on the frame around an axle axis;
    a plurality of erectable pistons respectively circumferentially secured in an annular trough concentrically recessed in a rim of said flywheel rotor;
    a cylinder block fastened on a housing fixed on the frame, and juxtapositionally cooperatively forming an engine cylinder with the annular trough of the flywheel rotor, with the annular trough rotatably slidably engaging with the cylinder block juxtaposed to the rim of the flywheel rotor;
    a combustion chamber formed in the engine cylinder as defined among a cylinder head formed on a feeding end of the engine cylinder, the cylinder block, each of the plurality of said erectable pistons as raised by an erecting means fixed on the frame beyond the cylinder head upon rotation of said flywheel rotor, and the annular trough in the rim of the flywheel rotor;
    an air inlet port formed in a feeding end to receive air and to supply the air into the combustion chamber via an air passage;
    a fuel system for injecting fuel from at least one of fuel reservoirs into the combustion chamber via a fuel pump;
    at least one igniter having igniting terminals protruding into a combustion chamber adjacent to the cylinder head for igniting a mixture of the air and the fuel to force and drive said each of the plurality of said erectable pistons to rotate the flywheel rotor and to generate a mechanical energy output through the axle; and
    an exhaust port formed on an exhausting end for discharging combustion exhaust gas out of the engine cylinder.

2. The rotary engine according to claim 1, wherein said annular trough having said each of the plurality of said erectable pistons secured thereon includes: a bottom wall concentrically recessed radially in the rim of the flywheel rotor; and a pair of side walls formed on opposite sides of the annular trough and diverging radially outwardly from the bottom wall to form an inversed trapezoid shape.

3. The rotary engine according to claim 2, wherein said rim includes a plurality of receiving cavities equally spaced and circumferentially recessed in the bottom wall of the annular trough, each of the plurality of said receiving cavities provided for accommodating each said erectable piston therein.

4. The rotary engine according to claim 2, wherein each said erectable piston includes: a vane having a sleeve portion secured to a pivot, and a lever angularly secured to the pivot to projectively define an acute angle between the lever and the vane; with the pivot rotatably mounted in a pair of bearings fixed in a pair of side walls of the annular trough of the rim of said rotor, having a retainer retained in a side opening of the rim for limiting one said bearing for stably mounting each said piston in said each of the plurality of said receiving cavities.

5. The rotary engine according to claim 4, wherein said lever is externally connected with the pivot of the piston, as positioned outside the annular trough, to be rotatably passed through a space between a frame and the rim of the rotor.

6. The rotary engine according to claim 4, wherein said pivot of said each of the plurality of said the piston erectable pistons is rotatably mounted in a first end of said each of the plurality of said receiving cavities recessed in the annular trough to allow the vane to be slidably engaged in a pair of fan-shaped recesses recessed in opposite side walls of the annular trough;
whereby upon being raised by said erecting means secured on a frame beyond the cylinder head of the engine cylinder, the vane of said each of the plurality of said erectable pistons said piston will be is erected clockwise from a retracted position at a second end of said each of the plurality of said receiving cavity cavities until being retarded on a limiting edge of each of the pair of said fun-shaped recesses said recess.

7. The rotary engine according to claim 6, wherein said erecting means further includes a cam secured to a frame adjacent to the cylinder head of the engine cylinder; a round end formed on a front end of the cam and operatively biasing a lever of the piston about a pivot when the rotor is rotated to erect the vane upwardly outwardly, and a flat seat portion formed on a top of the cam to be slidably ridden thereon by the lever when the rotor is rotated.

8. The rotary engine according to claim 6, wherein said cylinder head further includes an arc bottom portion slidably engageable with a bottom wall of the annular trough, having the air passage formed through the arc bottom portion of the cylinder head and the cylinder block for leading the air into said each of the plurality of said receiving cavities through the air inlet port.

9. The rotary engine according to claim 1, wherein said cylinder head has a retracting means including a roller rotatably mounted in a bracket secured to and positioned in front of the cylinder head, having a roller periphery rotatably and tangentially engageable with a bottom wall of the annular trough of the rotor, adapted to retract a vane of the piston downwardly inwardly to be received in a receiving cavity in order to enter the cylinder head.

10. The rotary engine according to claim 1, wherein said cylinder block is formed as an arcuate shape concentric to the axle axis and fastened to said housing secured to the frame; and said cylinder block is juxtaposed to the rim of the flywheel rotor rotatably mounted on the frame.

11. The rotary engine according to claim 1, wherein said cylinder block further includes: the cylinder head formed at the feeding end; an arc-shaped outer wall formed in the cylinder block about the axle axis; a longitudinal axis formed in the engine cylinder as concentric about the axle axis, with a vane of said each of the plurality of said erectable pistons slidably engageable with the outer wall of the cylinder block as the engine cylinder is rotating.

12. The rotary engine according to claim 1, wherein said rim includes a pair of annular grooves respectively annularly recessed in a pair of shoulder portions of the rim to be slidably engaged with a pair of sealing strips resiliently retained in a pair of sliding grooves respectively annularly recessed in a pair of side extensions formed on opposite sides of the cylinder block, wherein each of the pair of said sealing strips is urged by a plurality of springs retained in each of the pair of said sliding grooves.

13. The rotary engine according to claim 1, wherein said engine cylinder further includes: a thermoelectric couple protruding into the combustion chamber for sensing an operating temperature in the combustion chamber; and a controller connected between the fuel system and the fuel pump for selectively pumping a specific fuel having an ignition point of combustion thereof most related to an operating temperature as sensed.

14. The rotary engine according to claim 1, wherein said cylinder block is secured to said housing fixed on the frame, and slidably engageable with the rim of the flywheel rotor by rotatably slidably engaging a pair of side flanges formed on opposite sides of said housing with a pair of annular extensions respectively annularly formed on opposite shoulder portions on the rim for stably mounting the rotor, the cylinder block and said housing on the frame.

15. The rotary engine according to claim 14, wherein said housing further includes: a plurality of retaining pins each engaged with a wedge portion formed on the cylinder block, an adjusting screw formed on a first end of said housing for fastening a first end of the cylinder block by an expansion force of compression spring retained between the cylinder block and the adjusting screw, and a stopping screw fixed on a second end of said housing for stopping the cylinder block as forced by the adjusting screw opposite to the stopping screw; and said wedge portion limited by each said retraining pin and adjustably thrusted centripetally to force said cylinder block to be smoothly slidable with said flywheel rotor.

16. The rotary engine according to claim 15, wherein each of the plurality of said retaining pins is a roller pin and is rotated in a single direction and is rotated in a counter-clockwise rotation which is opposite to a clockwise rotation of the flywheel rotor when operatively rotated; wherein said wedge portion is operatively retracted by synchronously rotating the retaining pin counter-clockwise; and wherein said wedge portion is operatively thrusted forwardly to be tightly engaged with a bottom periphery of said each of the plurality of said retaining pins; whereby said wedge portion, as inhibited by said each of the plurality of said retaining pins in the clockwise rotation, forces the cylinder block to be smoothly slidable with the flywheel rotor.

17. The rotary engine according to claim 1, wherein said cylinder head includes a sealing member embedded on a bottom and side portions of the cylinder head for ensuring a sealable slidable engagement with the annular trough of the rotor rim.

18. The rotary engine according to claim 1, wherein said piston includes a sealing member embedded on a periphery of a vane for ensuring a sealable slidable engagement with an outer wall of the cylinder block.

19. The rotary engine according to claim 1, wherein said flywheel rotor includes: an intermediate wheel member axially secured to the frame and sandwiched in between a pair of rim members, whereby upon assembly of the two rim members to be disposed on opposite sides of the intermediate wheel member, the flywheel rotor is formed; the annular trough formed among the two rim members and the intermediate wheel member as assembled; and said annular trough having the plurality of said erectable pistons formed therein.

20. The rotary engine according to claim 19, wherein each of the plurality of said pistons includes a sealing member tensioned by a spring and embedded in a cavity recessed in said annular trough for well sealing of said each of the plurality of said pistons.

* * * * *